Dec. 22, 1964    H. L. EVERROAD    3,162,261
MOTORIZED PERSONNEL CARTS
Filed May 27, 1963    2 Sheets-Sheet 1

INVENTOR.
HERBERT L. EVERROAD
BY
ATTORNEY

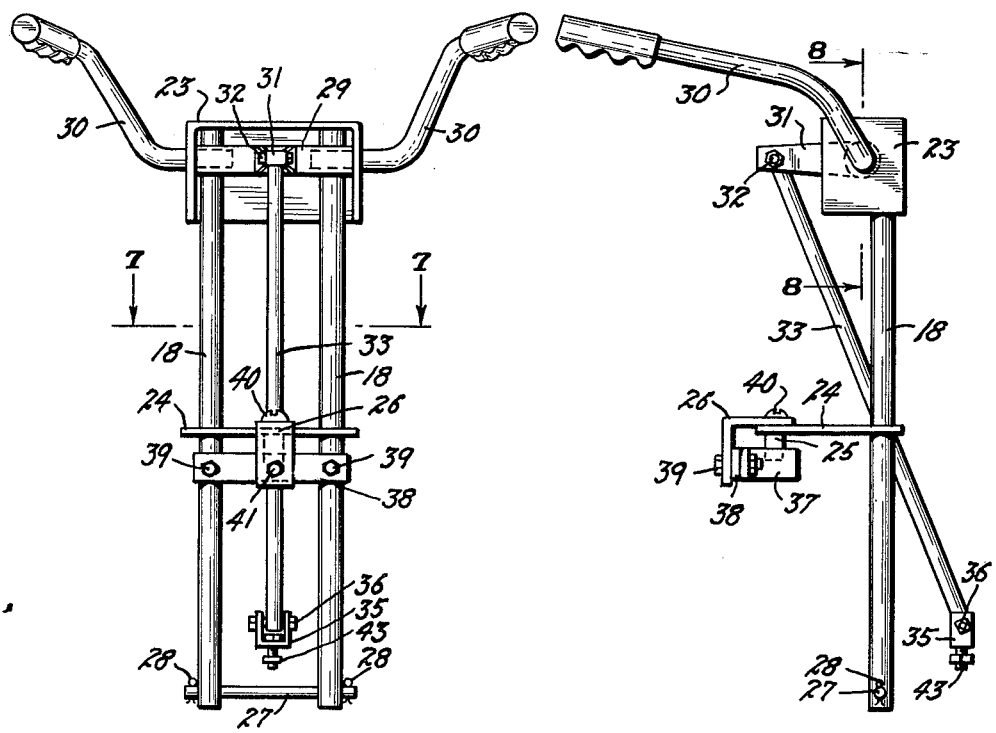

3,162,261
MOTORIZED PERSONNEL CARTS
Herbert L. Everroad, 4454 York St., Denver, Colo.
Filed May 27, 1963, Ser. No. 283,309
6 Claims. (Cl. 180—26)

This invention relates to a motorized riding device for transporting a person, in a standing position, over a floor. It will be found useful in large offices, mercantile establishments, manufacturing plants, and other relatively large areas now requiring considerable walking on the part of the personnel.

The invention relates more particularly to a conversion assembly which will enable a conventional motorized article-carrying, vehicle, such as illustrated and described in prior Patent No. 2,962,106, to be quickly, easily and economically converted for use as a personnel carrier.

The principal object of the invention is to provide a handle bar control assembly which can be applied to a motorized article carrying cart, such as the golf equipment cart described in the said prior patent, to enable a person to simply step upon the cart and control its speed and direction from a standing position without loss of time and to so construct the assembly that it will require but little more floor space than a standing individual.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 5 is an enlarged side elevational view of the handle bar control assembly removed from the vehicle;

FIG. 6 is a rear elevational view of the assembly;

FIG. 7 is a detail sectional view taken on the line 7—7, FIG. 6;

FIG. 8 is a detail sectional view taken on the line 8—8, FIG. 5; and

FIG. 9 is a detail sectional view taken on the line 9—9, FIG. 7.

Figure 1:
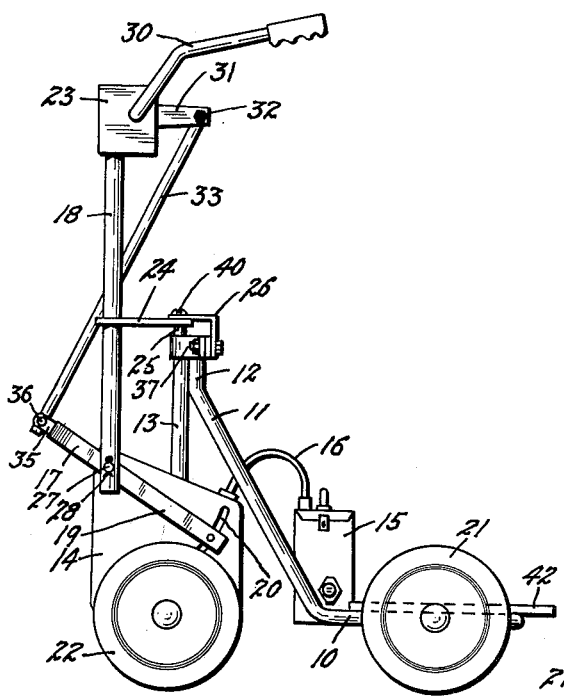
FIG. 1 is a side elevational view of a motorized vehicle of the type shown in prior Patent No. 2,962,106 with the handle bar control assembly of this invention applied thereto.
Figure 2:
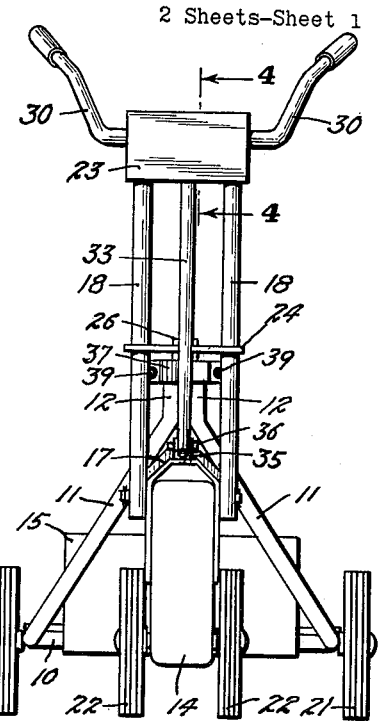
FIG. 2 is a front elevational view thereof.
Figure 3:
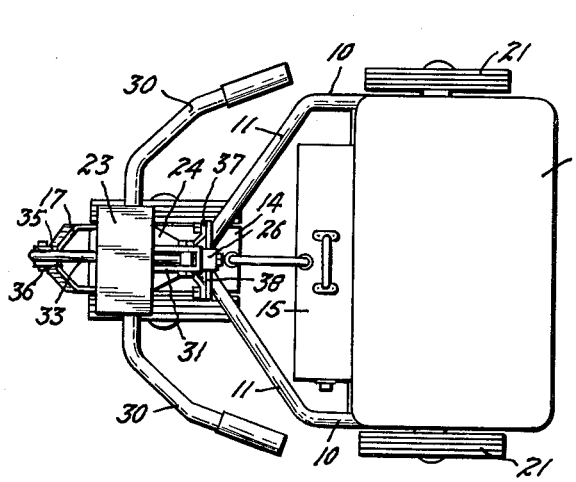
FIG. 3 is a top view thereof.
Figure 4:
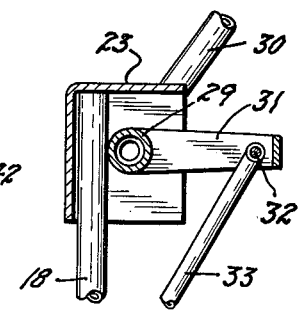
FIG. 4 is an enlarged fragmentary section taken on the line 4—4, FIG. 2.

As before stated, this invention relates more particularly to an assembly or kit for converting the motorized vehicle of Patent No. 2,962,116 to a personnel carrier. Elements of the motorized vehicle to be converted by this invention are shown on the drawing and designated by numeral as follows: horizontal, closed, integral, tubular frame 10; upwardly inclined forward extremities 11, on the tubular frame 10; vertically extending extremities 12, on the inclined forward extremities 11; vertical tubular column 13; freely steerable, motorized, traction element 14, containing an electric motor (not shown); battery case 15; electric cable 16; handle yoke 17; rheostat bar 19; rheostat bar slots 20; frame supporting wheels 21; and traction wheels 22, driven by the motor in the traction element 14. Such a vehicle is steered by swinging a tongue mounted on the yoke 17 to the left and right to rotate the traction element on the lower extremity of the column 13. The speed is increased by pushing the tongue downwardly to tilt the yoke 17 upon pivot bolts so as to elevate the rheostat bar 19 to decrease the resistance of a rheostat contained within the traction element 14. Lifting the tongue increases the electrical resistance and slows the vehicle to a complete stop if desired.

The vehicle as above described is shown in the said prior patent.

This invention relates more particularly to a handle bar control assembly for converting a vehicle having the above known elements for use as a stand-up personnel carrier. The conversion assembly is shown independent of the vehicle in FIGS. 6–9. The assembly employs two tubular, vertical, spaced-apart posts 18 fixedly mounted at their upper extremities in a hollow head box 23 having a closed front, closed top and closed ends. The rear and bottom of the head box are open.

A tie rod 27 extends through and between the lower extremities of the posts 18 and can be locked in place between the posts by means of cotter keys 28. A handle bar tube 29 rotatably extends between the closed ends of the head box 23 and two bicycle-type handle bars 30 are extended through the closed ends and are fixedly mounted in the extremities of the handle bar tube.

The posts 18 extend through and are permanently welded to a horizontal, triangular brace plate 24, the apex of which extends rearwardly. A pivot stud 25 is permanently affixed to and extends downwardly from the apex of the brace plate. An angle clip 26 is pivotally mounted on a pivot screw 40 extending axially downward into the stud 25. The angle clip 26 extends rearwardly and downwardly from the apex of the brace plate. A horizontal clamp bar 38 is mounted at its middle on the angle clip 26 through the medium of an attachment bolt 41 and a bowed clamping strap 37 is secured at its extremities to the clamp bar 38 by means of suitable clamp bolts 39.

A hollow crank lever 31 is welded to and extends rearwardly from the mid-point of the handle bar tube 29 terminating in a pivot bolt 32 from which a tubular connecting rod 33 depends through a clearance notch 34 in the forward edge of the brace plate 24. The connecting rod terminates in a U-shaped attachment clip 35 which is pivoted to the rod upon a suitable pivot bolt 36.

The conversion mechanism is applied to the previously described motorized vehicle by removing the pivot bolts normally used for pivoting the yoke 17 on the traction element 14 and replacing them by extending the pivot rod 27 through the present bolt holes so that it will extend completely across and protect from the opposite sides of the traction element 14. The posts 18 are then secured in place on the projecting extremities of the tie rod 27 by means of the cotter keys 28 and the posts are swung upwardly to a vertical position. The vertical extremities 12 of the frame 10, and the column 13 are then cut off at the height of the brace plate 24 and the three tubes, that is, the two vertical tubes 12 and the column 13, are clamped tightly together by means of the clamping strap 37 and are clamped tightly against the clamp bar 38 through the medium of the clamp bolts 39. The pivot stud 25 is now inserted into the hollow, upper cut extremity of the column 13 and is held in place therein by attaching the angle clip 26 to the clamp bar 38 through the medium of the attachment bolt 41. The tongue of the former vehicle is now removed from the yoke 17 and the attachment clip 35 is swung against the mid-point of the yoke 17 and is secured thereto by means of a suitable attachment bolt 43. A floor plate 42 is now mounted on the tubular frame 10 and the device is ready for use as a motorized personnel carrier.

The user stands vertically on the floor plate 42 and grips the handle bars 30 in the two hands. Downward movement of the handle bars swings the yoke upwardly to actuate the conventional rheostat to start the traction wheels 22 revolving. Upward movement stops the wheels 22. Steering is accomplished by simply turning the handle bars to the left or right to swing the traction element 14 sidewardly similarly to steering a conventional bicycle except that the steering is done from a convenient standing position.

While the invention has been described as more particularly adaptable for use with a specific golf cart, the same construction could be also applied to any type of wheeled, power-driven vehicle device to which the combination of elements described herein would be adaptable.

While a specifica form of the invention has been described and illustrated herein, it is to be understood that the same may be varied, within the scope of the appended claims, without departing from the spirit of the invention.

Having thus described the invention, what is claimed and desired secured by Letters Patent is:

1. A motorized personnel carrier comprising: a traction element supported on traction wheels and containing a motor for driving said traction wheels and a rheostat for controlling the speed of said motor; a tiltable yoke mounted on said traction element and operatively connected to said rheostat for controlling the latter; a tubular column extending upwardly from said traction element, the latter being mounted on said column so as to be rotatable in a horizontal plane; a chassis frame; wheels supporting said chassis frame, said chassis frame extending forwardly and upward to a fixed connection with said column; a platform supported by said chassis frame; speed control means connected to said yoke for tilting the latter for actuating said rheostat, a tubular post mounted on each side of said traction element and extending upwardly in parallel relation; a brace plate mounted on said posts and extending rearwardly therefrom to a position over said column; a pivot stud affixed to and extending downwardly from said brace plate into rotatable engagement in the upper extremity of said column so that said posts may rotate with said traction unit about the axis of said column; and means for manually rotating said posts to the right and left.

2. A motorized personnel carrier as described in claim 1 in which the means for manually rotating said posts comprises: a head box mounted on the uper extremities of said posts; and handle bars projecting oppositely outward from said head box.

3. A motorized personnel carrier as described in claim 2 in which the speed control means comprises: a horizontal handle bar tube rotatably mounted in said head box, said handle bars being fixedly mounted in said handle bar tube and projecting oppositely outward therefrom; a crank lever projecting radially from said handle bar tube; and a connecting rod connected between said crank lever and said yoke so that vertical rotative movements of said handle bars will be communicated to said yoke to actuate said rheostat.

4. The combination with a motorized vehicle of the type having a motorized traction element supported on traction wheels and rotatably mounted on the lower extremity of a vertical tubular column, of a post mounted on, and extending upwardly from, each side of said traction element; a brace plate mounted on and extending rearwardly from said posts to a position over said column; a pivot stud extending downwardly from said brace plate into the top of said column; a head box mounted on the upper extremities of said posts; and handle bars projecting oppositely outward from said head box for rotating said posts and said traction element as a unit about said column.

5. The combination as described in claim 4 in which the handle bars are vertically movable and having means for controlling the speed of said traction unit in consequence of vertical movements of said handle bars.

6. A conversion assembly for motorized vehicles having a traction element rotatably mounted on the lower extremity of a tubular column comprising: a horizontal brace plate adapted to be positioned over said column; a pivot stud extending downwardly from said brace plate and adapted to be rotatively positioned in the upper extremity of said tubular column to pivot said brace plate thereon; two vertical spaced-apart, parallel, tubular posts; a tie rod affixed to and extending horizontally between the lower extremities of said posts and adapted to be passed through said traction element for mounting said posts thereon; and handle bars mounted on and extending oppositely outward from said posts for rotating the latter about the axis of said pivot stud.

References Cited by the Examiner
UNITED STATES PATENTS

| | | | |
|---|---|---|---|
| 1,686,427 | 10/28 | Wallgren | 280—7.1 X |
| 2,486,095 | 10/49 | Armstrong | 180—26 |
| 2,511,320 | 6/50 | Benson | 280—279 |
| 2,706,008 | 4/55 | Voigt | 180—19 |
| 2,771,145 | 11/56 | Peters | 180—26 |
| 2,879,858 | 3/59 | Thomas | 180—65 X |
| 2,924,287 | 2/60 | Bramley | 180—26 |
| 2,962,106 | 11/60 | Burnside | 180—65 X |

A. HARRY LEVY, *Primary Examiner.*
KENNETH H. BETTS, *Examiner.*